(12) United States Patent
Eschenbach

(10) Patent No.: US 6,830,538 B2
(45) Date of Patent: Dec. 14, 2004

(54) CYCLODIAL DRIVE FOR EXERCISE APPARATUS

(76) Inventor: Paul William Eschenbach, 290 S. Tyger La., Roebuck, SC (US) 29376

( * ) Notice: Subject to any disclaimer, the term of this patent is extended or adjusted under 35 U.S.C. 154(b) by 86 days.

(21) Appl. No.: 10/303,938

(22) Filed: Nov. 26, 2002

(65) Prior Publication Data

US 2004/0102291 A1 May 27, 2004

(51) Int. Cl.⁷ .......................... A63B 21/00; A63B 21/22
(52) U.S. Cl. ............................. 482/52; 482/57; 482/60; 482/62
(58) Field of Search .................... 482/51–53, 57–65, 482/79–80

(56) References Cited

U.S. PATENT DOCUMENTS

| | | | |
|---|---|---|---|
| 2,088,332 A | 7/1937 | Marchou ....................... 74/52 |
| 5,419,572 A | 5/1995 | Stiller et al. ................ 280/252 |
| 5,433,680 A | 7/1995 | Knudsen ....................... 482/57 |
| 5,833,583 A | 11/1998 | Chuang ........................ 482/60 |
| 5,836,855 A | 11/1998 | Eschenbach ................... 482/57 |
| 5,938,570 A | 8/1999 | Maresh ......................... 482/57 |
| 6,334,836 B1 | 1/2002 | Segasby ......................... 482/4 |

Primary Examiner—Stephen R. Crow

(57) ABSTRACT

The present invention relates to a drive mechanism that converts a force supplied from an operator or other means along a complex curve path into rotary motion. More particularly, the present invention relates to a cyclodial drive mechanism configured for an operator driven or motor driven exercise apparatus such as a stationary bicycle, recumbent stationary bicycle, cross trainer or other devices. The present invention relates to the kinematic motion control of pedals which follow more complex curves having two or more lobes and spirals. More particularly, a cyclodial drive mechanism based upon a linkage and gear pair can be incorporated into several exercise apparatus to drive a flywheel.

31 Claims, 7 Drawing Sheets

CYCLODIAL DRIVE FOR EXERCISE APPARATUS

BACKGROUND OF THE INVENTION

1. Field

The present invention relates to a drive mechanism that converts a force supplied from an operator or other means along a complex curve path into rotary motion. More particularly, the present invention relates to a cyclodial drive mechanism configured for an operator driven or motor driven exercise apparatus such as a stationary bicycle, recumbent stationary bicycle, cross trainer or other devices.

2. State of the Art

The benefits of regular exercise to improve overall health, appearance and longevity are well documented in the literature. For exercise enthusiasts, the search continues for safe apparatus that provides exercise for maximum benefit in minimum time with less boredom.

Exercise bikes currently use simple cranks to guide the feet along a circular path while receiving operator force to rotate a flywheel. Several attempts have been made to guide the feet along an elliptical path while seated for exercise such as Eschenbach in U.S. Pat. No. 5,836,855 and Maresh in U.S. Pat. No. 5,938,570. Knudsen in U.S. Pat. No. 5,433,680 shows an elliptical path generating mechanism with pedals having only one pivot allowing the pedal to rotate unconstrained about the pivot as in a bicycle crank. Marchou in U.S. Pat. No. 2,088,332 shows a gear pair configured to receive force from a piston. Stiller et al. in U.S. Pat. No. 5,419,572 shows a pair of gear stacks used to guide foot pedals along an elliptical path for a bicycle.

Recently, a new category of exercise equipment has appeared on the commercial market called elliptical cross trainers. These cross trainers guide the feet along a generally elliptical shaped curves to simulate the motions of jogging and climbing. Several commercial cross trainers are now offered with elliptical foot movement that be changed when desired by an operator.

Cyclodial curves such as the Three Leaved Rose and Four Leaved Rose can be generated by mathematical formulas as shown on page 426 in CRC Standard Mathematical Tables published by the Chemical Rubber Publishing Company. Spiral curves are given on page 423 of the same book. Segasby in U.S. Pat. No. 6,334,836 shows a gear pair to guide a foot pedal along an ellipse, circle or straight line depending upon where the pedal is attached to the planet gear. The sun gear to planet gear ratio is 2/1. Several dead spots occur with this embodiment where the pedal is unable to accept force from the foot during a portion of the cycle. Chuang in U.S. Pat. No. 5,833,583 offers an improvement in a drive mechanism intended to guide the foot along an elliptical path using a gear pair and a slideable foot support. The slideable foot support helps to overcome the dead spots along an elliptical path as seen in the Segasby device. However, it is difficult in practice to guide a slideable member without clearance problems over extended use.

There is a need for a drive mechanism to guide a pedal, foot support, connector link or handle along a cyclodial curve without slideable members. There is a further need for a cyclodial drive mechanism that can be incorporated in an exercise apparatus or other device where the drive pivot such as a pedal follows a cyclodial curve having more than two leaves or lobes as seen with elliptical curves. There is a further need for a drive mechanism that changes radius on a periodic basis.

It is one objective of this invention to provide a cyclodial drive that converts complex pedal movements into rotary motion. Another objective of this invention is to integrate the cyclodial drive into several exercise apparatus. Yet another object of this invention is to provide cyclodial curves for exercise having multiple leaves or lobes.

SUMMARY OF THE INVENTION

The present invention relates to the kinematic motion control of pedals which follow more complex curves having two or more lobes and spirals. More particularly, a cyclodial drive mechanism based upon a linkage and gear pair can be incorporated into several exercise apparatus to drive a flywheel.

In the preferred embodiment, a pair of circular sun discs are fixed to a frame. Planet discs are configured to orbit the sun discs with rotation determined by the sun/planet size ratio. The rotary movement of the planet disc is converted into cyclodial movement by a linkage pivotally connected to the planet disc. When the sun/planet size ratio equals two, elliptical type curves result having two lobes. These cyclodial curves are centered about the center of the sun disc. When the size ratio does not equal two, more complex cyclodial curves result having more than two lobes or spirals.

A crank is rotatably connected to the center of the sun disc and supports the planet disc at a pivot. The sun disc and planet disc can be coupled as a gear pair or by a timing belt, chain or other means. When a pair of spur gears are used with teeth engaged, the planet rotates in the same direction as the crank. The introduction of an idler gear between the sun gear and planet gear, where the sun and planet gear teeth are engaged only by the idler gear, will cause the planet gear to rotate opposite in direction to the crank. The use of a timing belt or chain to engage the teeth will also cause the planet gear to rotate opposite the crank. A pair of sun discs, planet discs and cranks will usually be needed for an exercise apparatus using two pedals. In some cases, a linkage or gear turnaround can be used in lieu of the second cyclodial drive.

A pair of cranks are connected to a crankshaft that passes through each sun disc. A loading pulley or sprocket is attached to the crankshaft between the sun discs to drive a flywheel or other apparatus. Alternately, a motor engaged with the loading pulley or sprocket can drive the cyclodial drive to be used as a passive exercise apparatus or other device. Attached to each planet disc is a relatively short planet link that rotates with the planet disc. A rocker link is pivotally connected to each crank distal the planet gear. A pair of coupler links are pivotally connected to the planet links and rocker links. The crank, planet link, rocker link and coupler link form a linkage which is connected to the planet disc and crankshaft. Each coupler link is extended to provide driving force input/output for a drive pivot from a pedal, foot support member, arm lever, handle or other means of force application.

A first application of the cyclodial drive described above, would be to a stationary exercise bike having a seat located generally above the cyclodial drives and with a handle for the arms. Pedals would be connected at the drive pivot for the feet of the operator to supply the driving force directly to the driving pivots. A flywheel would be coupled to the loading pulley with a timing belt along with some form of load resistance.

A second application would be similar to the first application except the seat is closer to the floor to form a recumbent bike.

A third application would have a pair of foot support members pivotally connected to the drive pivots and to a pair of guides to form a cross trainer. The guides can take many forms such as a rocker link, roller and track or other guide linkage. Pedals would be attached to the foot support members. Arm exercise can also be coordinated with the foot support movement. The cyclodial curve generated by the cyclodial drive would be modified at the pedal, in the form of a height reduction or concentric ellipses with a spiral cyclodial curve.

A fourth application has a pair of arm levers pivoted to a frame and pivotally connected to the drive pivots with a pair of connector links. A back and forth hand movement drives the cyclodial drive. The hand stroke will vary according to the choice of sun/planet size ratio. Foot supports can be added to the arm levers. The drive pivot dwells at a minimum radius from the crankshaft then increases to dwell at a maximum radius. The sequence continues as the crank rotates.

A fifth application is intended for arm exercise only where a pair of handles are pivotally connected to the drive pivots. Again a flywheel and load resistance would be driven by the cyclodial drive. The operator can be seated or standing.

Alternately, a motor can be attached to any of the applications to drive the cyclodial drive for a passive system to rehabilitate the arms and legs or other usage. Other forms of load resistance such as friction discs, magnetic, air, friction belt, etc. may also be used.

In summary, this invention provides the user with a cyclodial drive that can be incorporated into a variety of exercise apparatus or other devices. The cyclodial drive can have a number of different cyclodial curve paths depending upon the sun/planet size ratio. Cyclodial curves with multiple lobes or spirals produce a different pedal movement for each lobe traversed by the pedal to reduce the boredom of exercise and to exercise different muscles.

DETAILED DESCRIPTION OF THE EMBODIMENTS

Figure 1:
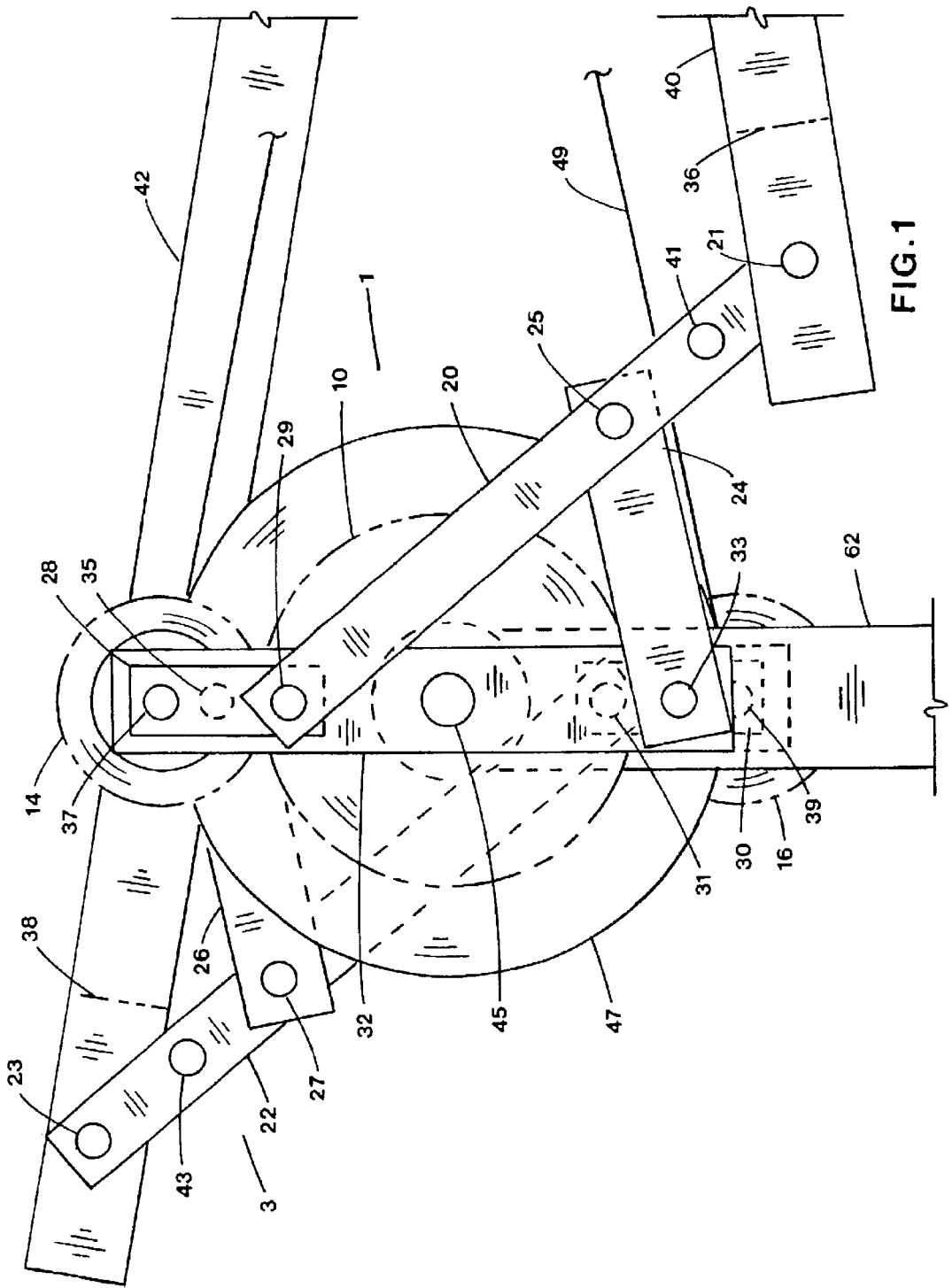
FIG. 1 is a right side elevation view of the preferred embodiment of a cyclodial drive constructed in accordance with the present invention.
Figure 2:
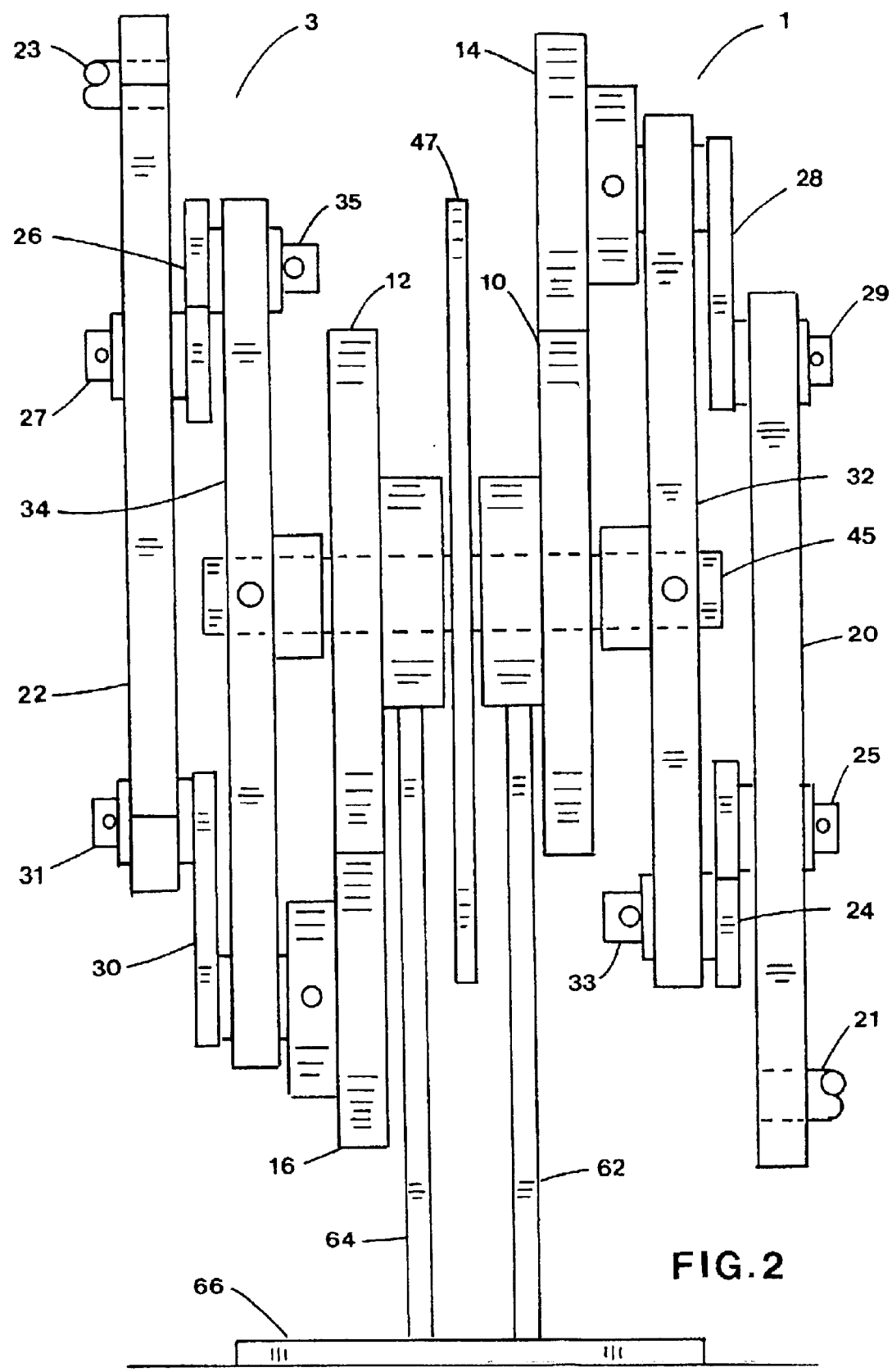
FIG. 2 is an end view of the preferred embodiment shown in FIG. 1.

Referring to the drawings in detail, a pair of cyclodial drives 1,3 are shown in FIGS. 1 and 2 where sun gears 10,12 are attached to cyclodial drive supports 62,64. Alternately, each sun gear can be driven by a motor (not shown) to vary the cyclodial curves even more. Crankshaft 45 passes through the centers of sun gears 10,12 to couple cyclodial drives 1 and 3. Cranks 32,34 are attached to crankshaft 45 generally 180 degrees apart for radial symmetry. However, it should be understood that cranks 32,34 can be secured to crankshaft 45 at other angles for non-symmetric coupling of cyclodial drives 1 and 3 and remain within the scope of this invention. Planet gears 14,16 are connected to cranks 32,34 generally 180 degrees apart at planet pivot shafts 37,39 with teeth (not shown) that mesh with sun gears 10,12. Planet links 28,30 are attached to planet pivot shafts 37,39 to rotate with planet gears 14,16 where the ends of the planet links 28,30 are positioned equidistant from crankshaft 45. However, it is understood that the ends of planet links 28,30 can be positioned at different distances from crankshaft 45 to achieve special effects in the motion.

Rocker links 24,26 are connected to cranks 32,34 at rocker pivots 33,35 distal to planet pivot shafts 37,39. Rocker pivots 33,35 and planet pivot shafts 37,39 are shown to be collinear with crankshaft 45. However, it is understood that the crankshaft 45 does not need to be collinear with planet pivot shafts 37,39 and rocker pivots 33,35. Coupler links 20,22 are connected to planet links 28,30 at pivots 29,31 and to rocker links 24,26 at pivots 25,27. Drive pivots 21,23 are located on coupler links 20,22 to transfer drive force into or out of the coupler links 20,22. While these drive pivots 21,23 are shown to be positioned collinear with pivots 29,31 and 25,27, it is understood that a non-linear position arrangement would work just as well for this invention. Foot support members 40,42 are connected to coupler links 20,22 at drive pivots 21,23. Shorter foot support members become pedals 36,38. Other means of force transfer to pivots 21,23 may also be used.

When force is imposed upon drive pivots 21,23, cranks 32,34 rotate to cause planet gears 14,16 to orbit sun gears 10,12. Sprocket 47 is attached to crankshaft 45 to drive chain 49. Drive pivots 21,23 will follow a cyclodial curve determined by the diameter ratio of sun gears 10,12 to planet gears 14,16. A 2/1 gear ratio will generate an elongate curve having two lobes similar to an ellipse (not shown). The resulting cyclodial curves for a sample of many different gear ratios available will be shown in applications below. When drive pivots 21,23 are moved to alternate positions 41,43 on coupler links 20,22, a different cyclodial curve result (smaller curve size where positioned). Drive pivots 21,23 can also be positioned upon rocker links 24,26 to generate similar cyclodial curves.

Figure 3:
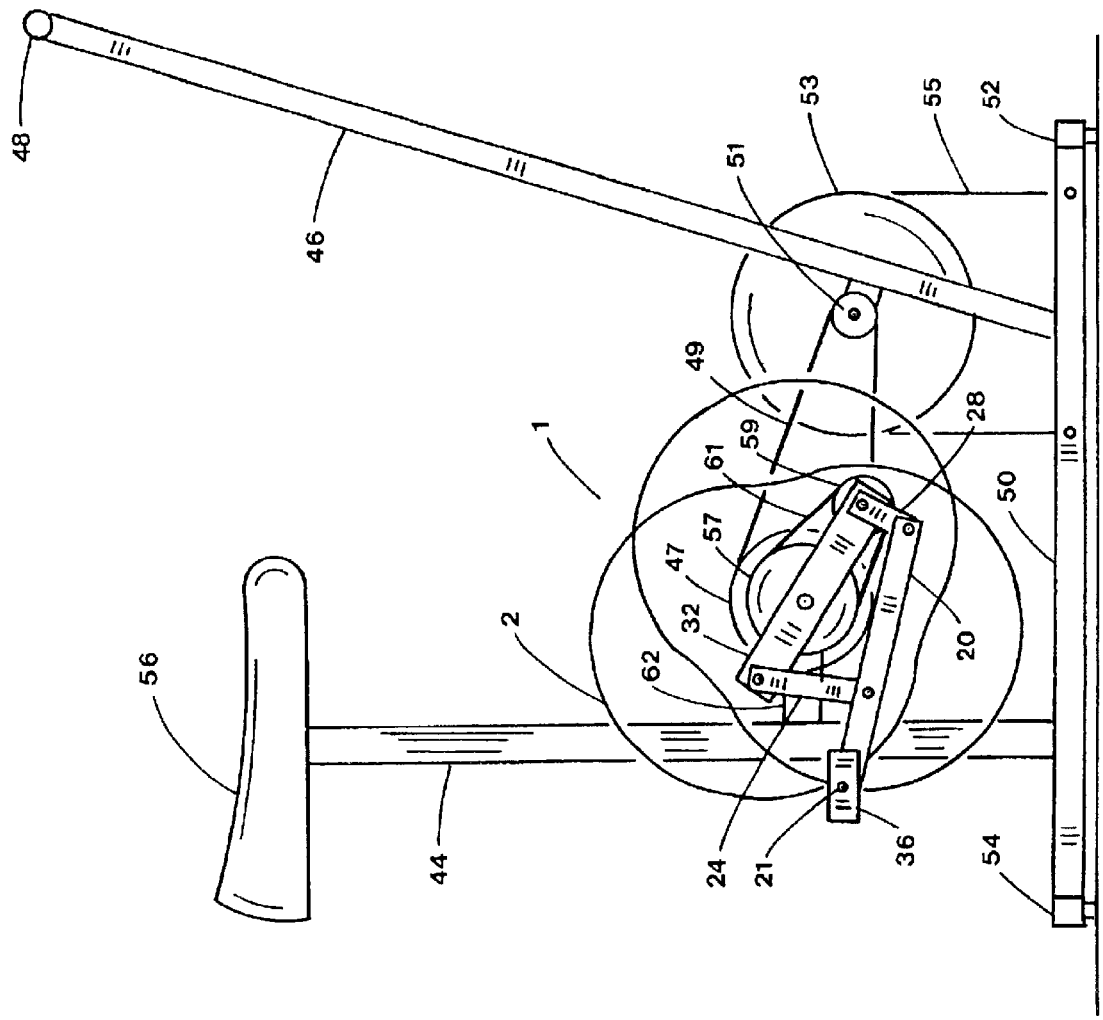
FIG. 3 is a side view of an exercise bicycle incorporating the cyclodial drive shown in FIG. 1.

A first application of the cyclodial drives 1,3 as described in FIGS. 1 and 2 is shown in FIG. 3 as an improvement to an exercise bike. Cyclodial drive 3 is not shown for clarity. Seat 56 is attached to post 44 which is supported by frame member 50. Cyclodial drive supports 62,64 are attached to post 44. Frame members 52,54 are configured to rest upon the floor with frame member 50 intermediate. Upright 46 is attached to frame member 50 and supports handlebar 48 and flywheel 53. Flywheel sprocket 51 is coupled to sprocket 47 by chain 49. Adjustable friction bands 55 provide load resistance about the circumference of flywheel 53.

When the foot of an operator applies force to pedal 36, drive pivot 21 rotates crank 32 to drive flywheel 53. In this application, the planet disc 59 and sun disc 57 are sprockets coupled by chain 61. The chain 61 coupling causes the planet disc to rotate opposite in direction to crank 32. The sun/planet diameter ratio is −1.5/1 which causes drive pivot 21 to follow cyclodial curve 2 which has three lobes. The complex pedal movement requires the use of additional leg muscles for improved exercise.

Figure 4:
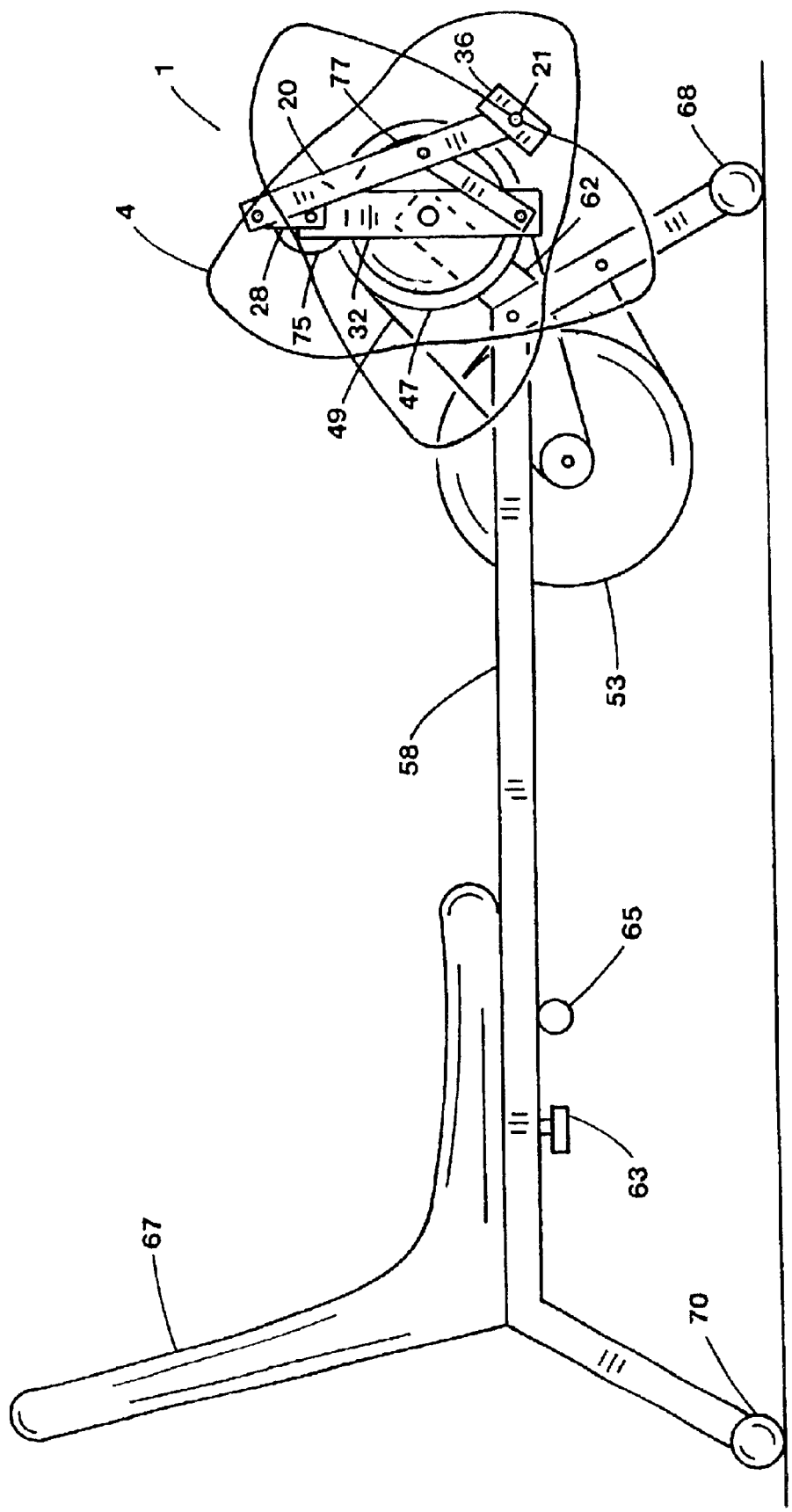
FIG. 4 is a side view of a recumbent exercise bicycle incorporating the cyclodial drive shown in FIG. 1.

A second application of cyclodial drives 1,3 described in FIGS. 1 and 2 is shown in FIG. 4 as a recumbent bike. Cyclodial drive 3 is not shown for clarity. Seat 67 is supported by frame members 58,70,68 where knob 63 can be loosened to slide seat 67 back and forth along support member 58. Cyclodial drive supports 62,64 are attached to support member 58 as is flywheel 53.

When the foot of the operator applies force to drive pivot 21 through pedal 36, crank 32 rotates to drive flywheel 53 and drive pivot 21 follows cyclodial curve 4. Sun gear 77 is meshed with planet gear 75 with the sun/planet diameter ratio being 2.5/1 resulting in a cyclodial curve 4 that has five lobes. Handle 65 is attached to frame member 58 for arm support.

Figure 5:
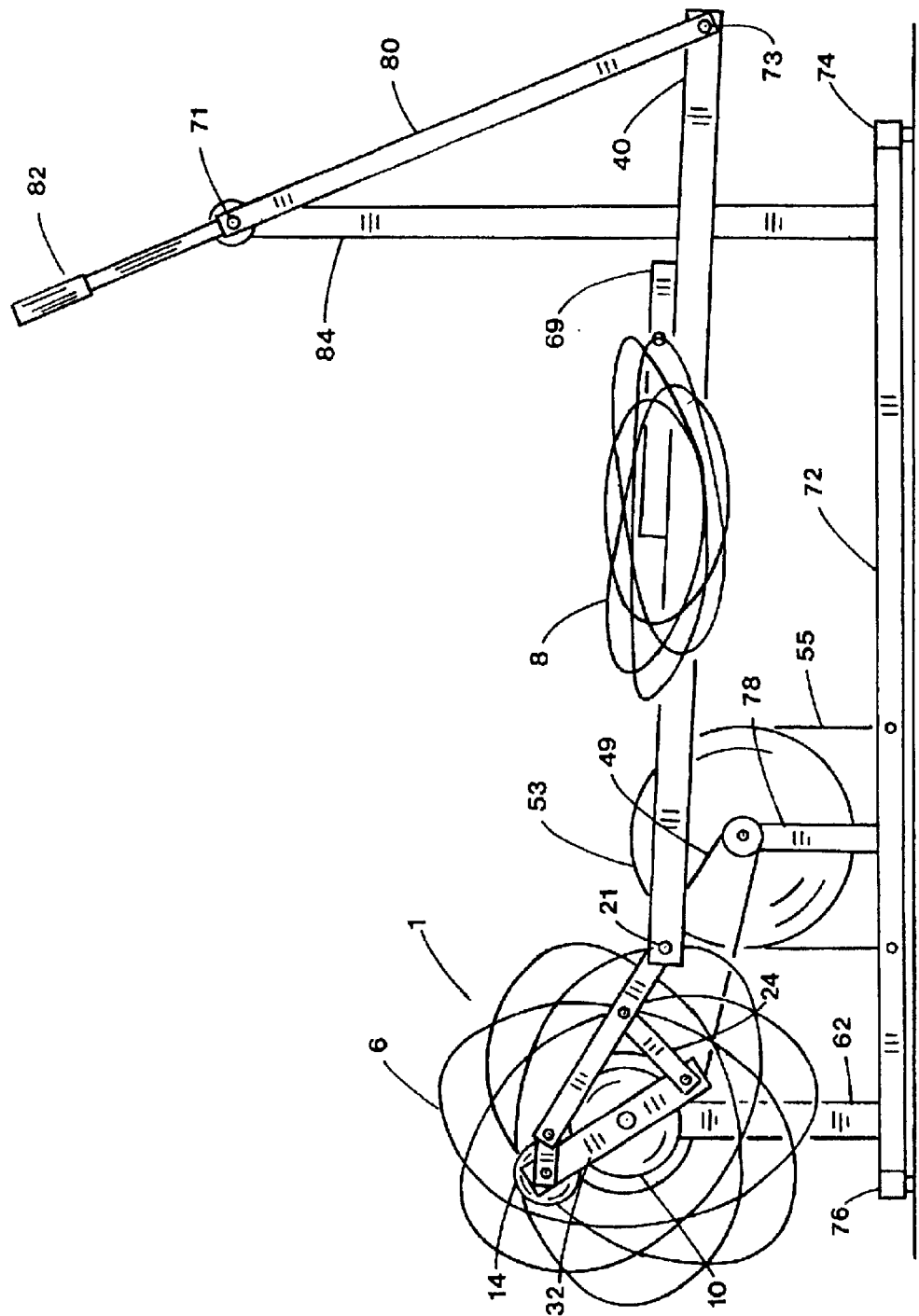
FIG. 5 is a side view of a cross trainer incorporating the cyclodial drive shown in FIG. 1.

A third application of the cyclodial drives 1,3 described in FIGS. 1 and 2 is a cross trainer shown in FIG. 5. Cyclodial drive 3 is not shown for clarity. Cyclodial drive supports 62,64 are attached to frame members 72,74,76. Flywheel 53 is supported by frame member 78 attached to frame member 72. Upright post 84 is attached to frame member 72 and guide 80 at pivot 71. Foot support member 40 is connected to guide 80 at pivot 73 and to drive pivot 21. Pedal 69 is attached to foot support member 40. It is understood that other forms of guides such as a roller and track (not shown) would do as well for guide 80.

Body weight of the operator upon pedal 69 applies force to drive pivot 21 which causes crank 32 to rotate and drive flywheel 53. Sun gear 10 is meshed with planet gear 14 with a sun/planet diameter ratio of 1.75/1 causing drive pivot 21 to follow cyclodial curve 6 having seven lobes. Pedal 69 follows modified cyclodial curve 8 also having lobes to give the operator a continuously changing foot path for improved exercise. Handle 82 is attached to guide 80 for arm exercise. Foot support member 42 and guide 82 are not shown for clarity.

Figure 6:
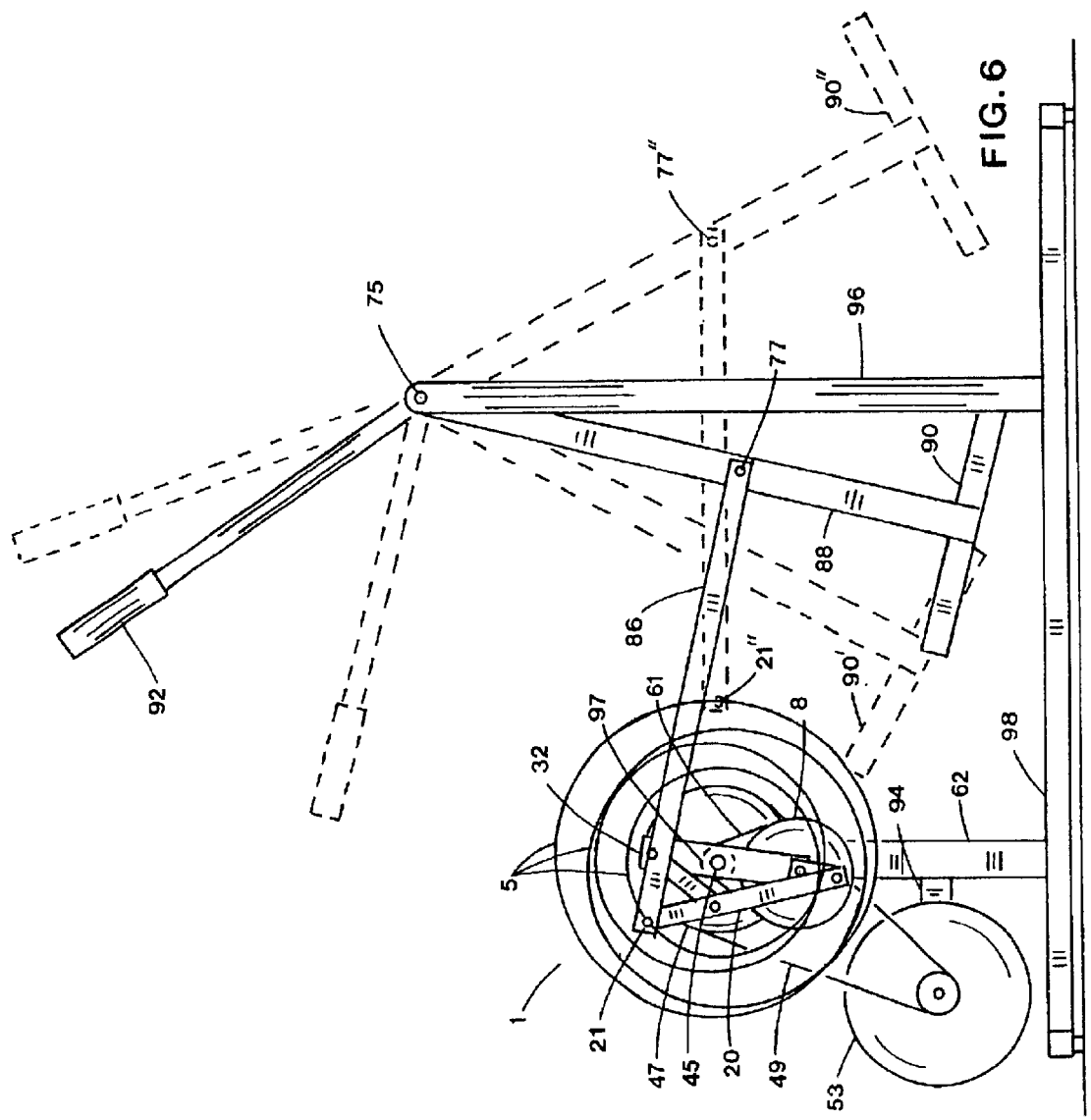
FIG. 6 is a side view of an arm lever/foot exercise apparatus incorporating the cyclodial drive shown in FIG. 1.

A fourth application of the cyclodial drive 1 described in FIGS. 1 and 2 is shown in FIG. 6 as a swinging foot and arm lever exercise apparatus. Frame members 94,96,98 support pivot 75 which supports foot link 88. Handle 92 is attached to move with foot link 88 for arm exercise. Pedal 90 is attached to foot link 88. Connector link 86 is connected to foot link 88 at pivot 77 and to drive pivot 21. Flywheel 53 is supported by frame member 94,62 and engaged with sprocket 47 by chain 49.

An operator stands on pedal 90 with hand on handle 92 for a back and forth movement to drive the cyclodial drive 1. Another handle 992 and pedal 990 would be provided for the other side of the body which are not shown for clarity. The two handles 92 and 992 would oscillate in opposite directions. The opposite movement could be supplied by cyclodial drive 3 (not shown) or a typical turnaround linkage (not shown).

Drive pivot 21 follows cyclodial curve 5 having spiraling circles determined by the sun 97/planet 8 ratio equal to −1/4. The spiraling circles 5 have a minimum radius relative to crankshaft 45 at drive pivot 21 location and a maximum radius at drive pivot 21" location. Pedal 90 will oscillate back and forth at a minimum swing corresponding to the minimum radius gradually increasing the swing to a maximum at pedal 90',90" locations. Arm levers 92,992 alone can be used to operate the cyclodial drive 1. Flywheel 53 can be replaced by a motor (not shown) to create a passive exercise apparatus. The continuously varying stroke relieves the boredom of exercise and uses muscles differently for improved exercise.

Figure 7:
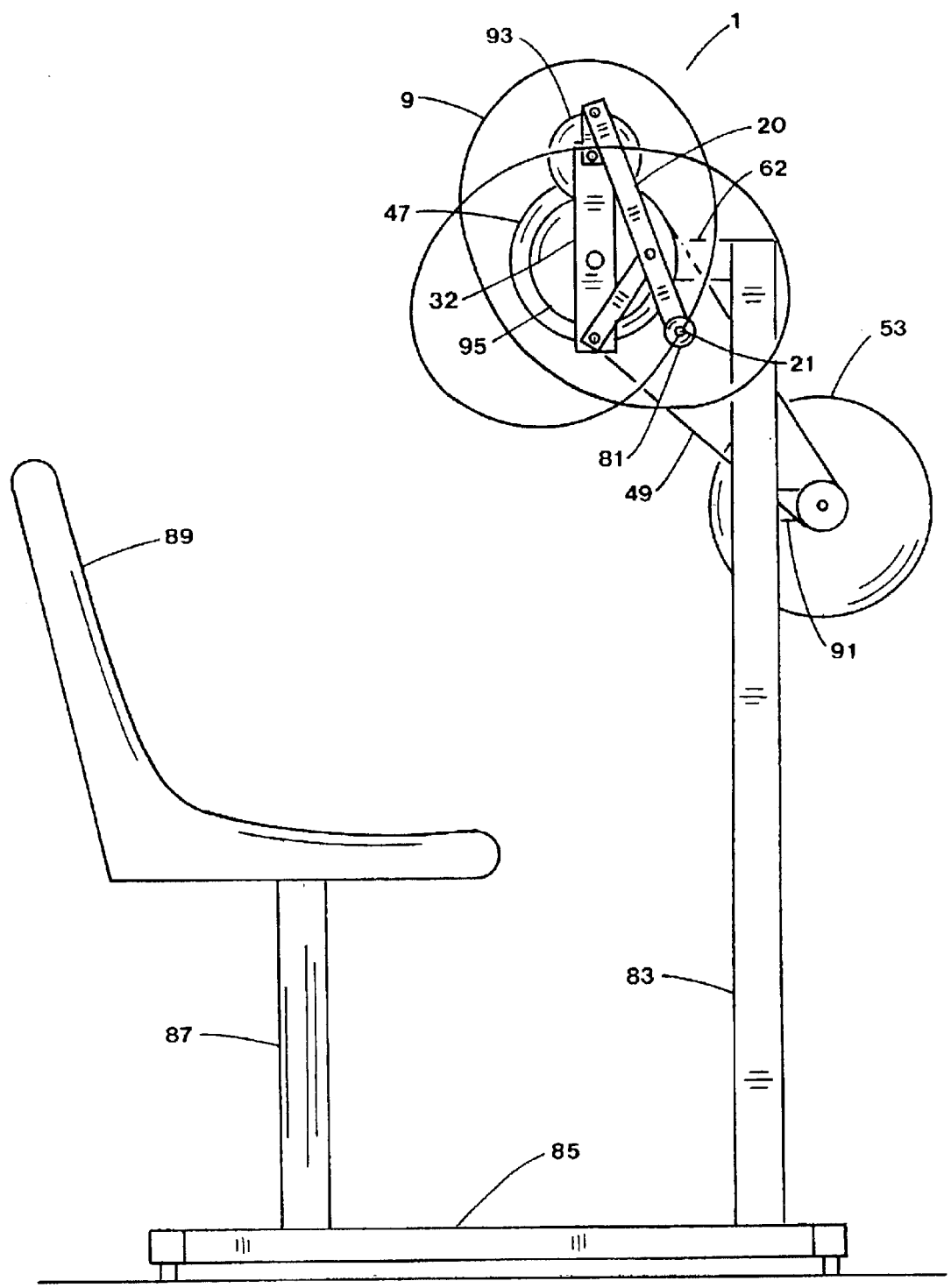
FIG. 7 is a side view of an arm exercise apparatus incorporating the cyclodial drive shown in FIG. 1.

A fifth application of the cyclodial drives 1,3 described in FIGS. 1 and 2 is shown in FIG. 7 as a hand operated exercise apparatus. Handle 81 is connected to drive pivot 21. Cyclodial drive supports 62,64 are attached to post 83 which is supported by frame 85. Seat 89 is supported by post 87 which is attached to frame 85 for the operator. Flywheel 53 is attached to post 83 by member 91. Cyclodial drive 3 for the other hand is not shown for clarity.

Application of force by the hands on drive pivots 21,23 by an operator positioned in seat 89 rotates cranks 32,34 to drive flywheel 53. Drive pivot 21 will follow cyclodial curve 9 having three lobes determined by sun 95 to planet 8 diameter ratio equal to 1.5/1. A motor (not shown) can be installed in place of flywheel 53 to drive the drive pivots 21,23 along cyclodial curve 9 for a passive rehabilitation exercise apparatus.

The present invention may be embodied in other specific forms without departing from its spirit or essential characteristics. The described embodiments are to be considered in all respects only as illustrative, and not restrictive. The scope of the invention is, therefore, indicated by the claims, rather than by foregoing description. All changes which come within the meaning and range of equivalency of the claims are to be embraced within their scope.

What is claimed is:

1. A cyclodial drive configured to generate a cyclodial curve path comprising:
   a frame, said frame configured to support said cyclodial drive;
   a sun disc, said sun disc attached to said frame;
   a planet disc, said planet disc operably associated with said sun disc and configured to orbit said sun disc;
   a crankshaft, said crankshaft configured to rotate about the center of said sun disc;
   a linkage, said linkage operably associated with said planet disc and said crankshaft;
   a drive pivot, said drive pivot positioned upon said linkage for the transfer of force;
   said transfer of force causing said linkage to rotate relative to said frame whereby said drive pivot follows said cyclodial curve path having more than two lobes;
   and a pair of limb support members, each said limb support member connected to said corresponding linkage at said drive pivot; each lower or upper limb pairs of an operator engaged with a corresponding limb support member whereby movement of each said limb support member provides user exercise.

2. The cyclodial drive according to claim 1 further comprising a pulley, said pulley connected to said crankshaft to drive a load resistance.

3. The cyclodial drive according to claim 1 further comprising a pulley, said pulley connected to said crankshaft and engaged with a motor to drive said linkage.

4. The cyclodial drive according to claim 1 further comprising a flywheel, said flywheel operably associated with said crankshaft to rotate when a drive force impinges upon said drive pivot to provide exercise for an operator.

5. The cyclodial drive according to claim 1 further comprising a companion cyclodial drive, said companion cyclodial drive connected to said cyclodial drive at said crankshaft;
   a flywheel, said flywheel engaged with said crankshaft.

6. The exercise machine according to claim 5 further comprising a seat, said seat configured to allow said operator to rotate said flywheel in the form of a stationary exercise bicycle.

7. The exercise machine according to claim 5 further comprising a pair of guides, each said guide pivotally connected to said limb support member to form a cross trainer exercise machine.

8. The cyclodial drive according to claim 1 further comprising a companion cyclodial drive, said companion cyclodial drive connected to said cyclodial drive at said crankshaft;
   a flywheel, said flywheel engaged with said crankshaft;
   a pair of handles, each said handle pivotally connected to said frame and operably associated with said corresponding linkage at said drive pivot;
   each hand of an operator engaged with a corresponding handle whereby movement of said hand causes said flywheel to move as an exercise machine.

9. The exercise machine according to claim 8 wherein said limb supporting members are configured to move with said handles.

10. The cyclodial drive according to claim 1 further comprising a handle, said handle pivotally connected to said drive pivot for arm exercise.

11. The cyclodial drive according to claim 1 wherein said sun disc is a sun gear and said planet disc is a planet gear, said planet gear and said sun gear being engaged to permit torque transfer.

12. The cyclodial drive according to claim 1 wherein said sun disc is a sun sprocket and said planet disc is a planet sprocket, said planet sprocket and said sun sprocket engaged by a chain to permit torque transfer.

13. The cyclodial drive according to claim 1 wherein said linkage comprises;
   a crank, said crank configured to support said planet disc at a pivot and and connected to said crankshaft;
   a planet link, said planet link attached to said planet disc;
   a rocker link, said rocker link pivotally connected to said crank;
   a coupler link, said coupler link pivotally connected to said planet link and to said rocker link;
   said drive pivot positioned upon said coupler link to transfer a force acting upon said drive pivot to said crankshaft.

14. The cyclodial drive according to claim 1 wherein said cyclodial curve is composed of a spiral curve, said spiral curve enclosing said crankshaft.

15. An exercise machine configured to include a cyclodial drive comprising:
   a framework, said framework configured to be supported by the floor;
   a sun disc, said sun disc attached to said framework;
   a planet disc, said planet disc operably associated with said sun disc and configured to orbit said sun disc;
   a crankshaft, said crankshaft configured to rotate about the center of said sun disc;
   a linkage, said linkage operably associated with said planet disc and connected to said crankshaft;
   an operator contact, said operator contact connected to said linkage at a drive pivot;
   said operator contact causing said linkage to rotate relative to said framework whereby said drive pivot follows said cyclodial curve path as determined by the size ratio of said sun disc relative to said planet disc having a value other than 2.0;
   and a pair of limb support members, each said limb support member connected to said corresponding linkage at said drive pivot; each lower or upper limb pairs of an operator engaged with a corresponding limb support member whereby movement of each said limb provides user exercise.

16. The cyclodial drive according to claim 15 wherein said cyclodial curve is composed of a spiral curve, said spiral curve enclosing said crankshaft.

17. The cyclodial drive according to claim 15 wherein said cyclodial curve is composed of several lobes, said lobes enclosing said crankshaft.

18. The cyclodial drive according to claim 15 further comprising a flywheel, said flywheel operably associated with said crankshaft to rotate when a drive force impinges upon said drive pivot to provide exercise for an operator.

19. The cyclodial drive according to claim 15 further comprising a companion cyclodial drive, said companion cyclodial drive connected to said cyclodial drive at said crankshaft;
   a flywheel, said flywheel engaged with said crankshaft.

20. The exercise machine according to claim 19 further comprising a seat, said seat configured to allow said operator to rotate said flywheel in the form of a stationary exercise bicycle.

21. The exercise machine according to claim 19 further comprising a pair of guides, each said guide pivotally connected to said foot support member to form a cross trainer exercise machine.

22. The cyclodial drive according to claim 15 further comprising a companion cyclodial drive, said companion cyclodial drive connected to said cyclodial drive at said crankshaft;
   a flywheel, said flywheel engaged with said crankshaft;
   a pair of handles for said operator contact, each said handle operably associated with said corresponding linkage at said drive pivot;
   each hand of an operator engaged with a corresponding handle whereby movement of said hand causes said flywheel to move.

23. The cyclodial drive according to claim 15 further comprising a pair of handles, each said handle pivotally connected to said framework and operably associated with said drive pivot for arm exercise.

24. The cyclodial drive according to claim 15 wherein said linkage comprises;
   a crank, said crank configured to support said planet disc at a pivot and connected to said crankshaft;
   a planet link, said planet link attached to said planet disc;
   a rocker link, said rocker link pivotally connected to said crank;
   a coupler link, said coupler link pivotally connected to said planet link and to said rocker link;
   said drive pivot positioned upon said coupler link to transfer said operator contact acting upon said drive pivot to said crankshaft.

25. A pair of cyclodial drives each configured to generate a cyclodial curve path comprising:
   a frame, said frame configured to support said cyclodial drives;
   a pair of sun discs, each sun disc attached to said frame;
   a pair of planet discs, each planet disc operably associated with a corresponding said sun disc;
   a crankshaft, said crankshaft configured to rotate about the center of said sun discs;
   a pair of cranks, each said crank attached to said crankshaft;
   a pair of planet links, each planet link pivotally connected to a corresponding said crank distal said crankshaft and attached to a corresponding said planet disc;

a pair of rocker links, each said rocker link pivotally connected to a corresponding said crank;

a pair of coupler links, each said coupler link pivotally connected to a corresponding said planet link and said rocker link;

a pair of drive pivots, each drive pivot positioned upon a corresponding said coupler link for the transfer of force;

said pair of cranks configured to move relative to said frame when said transfer of force acts upon said drive pivot whereby said planet discs orbit said sun discs causing said drive pivot to follow said cyclodial curve path;

a pair of foot support members, each said foot support member connected to said drive pivot; each said foot support member engaged with the foot of an operator to supply said transfer force to said drive pivot for exercise of said operator.

26. The cyclodial drives according to claim 25 further comprising a flywheel, said flywheel operably associated with said crankshaft to rotate when a drive force impinges upon said drive pivot to provide exercise for an operator.

27. The cyclodial drives according to claim 25 further comprising a load resistance, said load resistance operably associated with said crankshaft and, a means for adjustment of said load resistance, said means for adjustment configured to allow for variable intensity exercise.

28. The cyclodial drives according to claim 25 further comprising handles, said handles connected to said coupler links at said drive pivots to provide arm exercise for an operator.

29. The cyclodial drives according to claim 25 wherein said cyclodial curve is composed of a spiral curve, said spiral curve enclosing said crankshaft.

30. The exercise machine according to claim 25 further comprising a pair of guides, each said guide pivotally connected to said foot support member to form a cross trainer exercise machine.

31. The cyclodial drive according to claim 25 further comprising a pulley, said pulley connected to said crankshaft and engaged with a motor to drive said crankshaft.

* * * * *